United States Patent [19]

Kobayashi

[11] Patent Number: 4,611,231
[45] Date of Patent: Sep. 9, 1986

[54] SIGNAL PROCESSING APPARATUS FOR A VIDEO SIGNAL

[75] Inventor: Masaaki Kobayashi, Kawanishi, Japan

[73] Assignee: Matsushita Electric Industrial Co., Ltd., Osaka, Japan

[21] Appl. No.: 615,243

[22] Filed: May 30, 1984

[30] Foreign Application Priority Data

May 31, 1983 [JP] Japan .................. 58-97077
Jun. 24, 1983 [JP] Japan .................. 58-114505
Jun. 27, 1983 [JP] Japan .................. 58-116333

[51] Int. Cl.[4] .......... H04N 5/14; H04N 5/91; H04N 5/21
[52] U.S. Cl. .................. 358/160; 358/12; 358/21 R; 358/141; 358/166; 358/167; 358/310; 358/330; 358/340; 358/335; 358/36; 358/37; 360/33.1; 375/60; 381/14; 381/106
[58] Field of Search ........... 358/12, 21 R, 141, 160, 358/186, 310, 330, 335, 340, 167, 36, 166, 37; 360/9.1, 33.1; 375/60; 381/14, 106

[56] References Cited

U.S. PATENT DOCUMENTS 4,281,346 7/1981 Strobele .................. 358/166
4,481,547 11/1984 Sato ..................... 360/33.1

FOREIGN PATENT DOCUMENTS 0015499 9/1980 European Pat. Off. ............ 358/330

OTHER PUBLICATIONS

Theory and Application of Digital Signal Processing, by Lawrence R. Rabiner and Bernard Gold, pp. 205–209.

Primary Examiner—James J. Groody
Assistant Examiner—Michael D. Parker
Attorney, Agent, or Firm—Wenderoth, Lind & Ponack

[57] ABSTRACT

A video signal processing apparatus has an input terminal for receiving an input video signal and a delay line for delaying the input video signal. A first transmission circuit processes the video signal which has been delayed by the delay line and a first timer reversal circuit reverses the time sequence of the input video signal during a predetermined time period. A second transmission circuit processes the time reversed signal from the first time reversal circuit and a second time reversal circuit reverses the time sequence of the signal processed by the second transmission circuit. An adder circuit adds the signal processed by the first transmission circuit and the time reversed signal from the second time reversed circuit. A control pulse generator produces a control pulse sequence which inverts its level every predetermined period so as to control the first and second time reversal circuits. The output of the adder circuit serves as the output signal processing apparatus.

19 Claims, 8 Drawing Figures

SIGNAL PROCESSING APPARATUS FOR A VIDEO SIGNAL

BACKGROUND OF THE INVENTION

Field of the Invention

This invention relates to a signal processing apparatus which converts a signal such as a video signal to another signal having an arbitrary amplitude-frequency characteristic with flat group delay-frequency characteristic, and therefore is usable in a video signal transmission system such as a video tape recorder and a satelite broadcasting system.

In a conventional video tape recorder the video signal is frequency modulated to be recorded on a video tape. In the frequency modulating system in which the white noise is contained in the FM transmission path, the power spectrum of the noise contained in the demodulated signal increases in proportion to the frequency. In order to reduce the noise, the intermediate and high frequency components of the video signal is emphasized (emphasis), or widened in frequency deviation range, before being frequency modulated, and after frequency demodulated de-emphasized (de-emphasis). On the other hand, the frequency range of the FM transmission path is limited by the frequency range (performance) of the electromagnetic conversion system such as the magnetic tape and the magnetic head. Due to this frequency range limitation, the amount of emphasis (emphasis factor) is limited or the signal must be clipped after emphasized. The small amount of emphasis causes a poor S/N (signal to noise ratio), and the signal clipping causes a signal distortion. This problem occurs in any FM transmission systems such as video tape recorders and satelite broadcasting systems.

Further, when a video signal is processed to obtain an arbitrary amplitude-frequency characteristic, a group delay distortion is caused so that the waveform of the processed video signal is distorted. Therefore, a practical signal processing apparatus having a flat group delay-frequency characteristic has been desired.

SUMMARY OF THE INVENTION

Accordingly, an object of this invention is to provide a signal processing apparatus which is capable of providing a larger amount of signal emphasis in the necessary frequency deviation range.

Another object of this invention is to provide a signal processing apparatus which is capable of reducing the peak level of the signal, maintaining the necessary amount of emphasis.

Still another object of this invention is to provide a signal processing apparatus having an arbitrary amplitude-frequency characteristic with preshoot and overshoot.

A further object of this invention is to provide a signal processing apparatus which converts an input video signal to a signal having an arbitrary amplitude-frequency characteristic, maintaining flat the group delay-frequency characteristic.

These objects can be accomplished by a signal processing apparatus comprising: a video signal input terminal for feeding an input video signal; a delay line for delaying said input video signal; a first transmission circuit having a transfer function G for processing the video signal delayed by said delay line; a first time reversal circuit for reversing the time sequence of said input video signal in a predetermined period; a second transmission circuit having the transfer function G for processing the time reversed signal from said first time reversal circuit; a second time reversal circuit for reversing the time sequence of the signal processed by said second transmission circuit in said predetermined period; an adder circuit for adding the signal processed by said first transmission circuit and the time reversed signal from said second time reversed circuit; a control pulse generator for producing a control pulse sequence inverting its level with said predetermined period to control said first and second time reversal circuits; and an output terminal coupled to an output terminal of said adder circuit.

Further, the above objects can be accomplished by a signal processing apparatus comprising: a video signal input terminal for feeding an input video signal; a first transmission circuit having a transfer function G for processing said input video signal; a first time reversal circuit for reversing the time sequence of the signal processed by said first transmission signal in a predetermined period; a second transmission circuit having the transfer function G for processing the time reversed signal from said first time reversal circuit; a second time reversal circuit for reversing the time sequence of the signal processed by said second transmission circuit; a control pulse generator for producing a control pulse sequence inverting its level with said predetermined period for controlling said first and second time reversal circuits; and an output terminal coupled to an output terminal of said second transmission circuit.

Further, the above objects can be accomplished by a signal processing apparatus comprising: a video signal input terminal for feeding an input video signal; a first transmission circuit having a transfer function G for processing said input video signal; a first time reversal circuit for reversing the time sequence of the signal processed by said first transmission circuit in a predetermined period; a second transmission circuit having a transfer function G for processing the time reversed signal from said first time reversal circuit; a signal transmission path for transmitting the signal processed by said second transmission circuit; a third transmission circuit having a transfer function 1/G for processing the signal transmitted by said signal transmission path; a second time reversal circuit for reversing the time sequence of the signal processed by said third transmission circuit in said predetermined period; a fourth transmission circuit having the transfer function 1/G for processing the time reversed signal from said second time reversal circuit; a control pulse generator for producing a first and a second control pulse sequences each inverting its level with said predetermined period; and an output terminal coupled to an output terminal of said fourth transmission circuit.

Each of the time reversal circuits used in the above described signal processing apparatus comprises: a first LIFO (last-in-first-out) memory capable of storing an input signal by said predetermined period; a second LIFO memory capable of storing the input signal by said predetermined period; a first changeover switch for alternatively applying the input signal to one of said first and second LIFO memories which is in write-in mode; and a second changeover switch for picking up the stored signal of one of said first and second LIFO memories which is in read-out mode, each of said first and second LIFO memories repeating alternatingly write-in mode and read-out mode with said predetermined period and when one of said first and second memories is in write-in mode the other being in read-out mode.

The predetermined period, or time unit, for reversing the time sequence of signal can be one or several line (horizontal synchronizing interval H) periods, one or several fields or one or several frames of video signal.

The above and other objects, features and advantages of the present invention will become more apparent from the following description taken together with the accompanying drawings in which:

DESCRIPTION OF THE PREFERRED EMBODIMENTS

Figure 1:
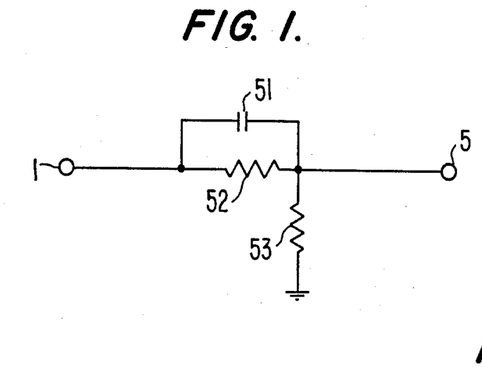
FIG. 1 is a circuit diagram showing the conventional emphasis circuit.

FIG. 1 shows a conventional emphasis circuit used in a video tape recorder. A video signal fed to an input terminal is emphasized and applied to an output terminal 5. The emphasis circuit is composed of a capacitor 51 whose capacitance is $C_1$, a resistor 52 whose resistance is $R_b$ and a resistor 53 whose resistance is $R_a$. For example, $C_1$, $R_a$ and $R_b$ are selected to satisfy the condition: $C_1 R_b = 1.3 \times 10^{-6}$ sec. and $(R_b + R_a)/R_a = 5$, in the NTSC Standard.

Figure 2:
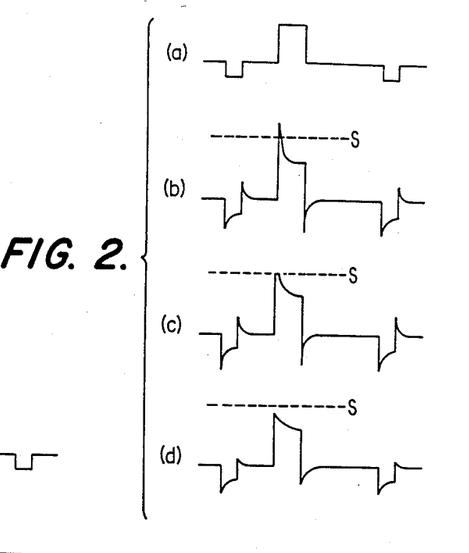
FIGS. 2(a)-(d) is waveform diagrams for explaining the conventional signal processing.

When a video signal having a waveform as shown in FIG. 2(a) is fed to the input terminal 1, an emphasized video signal having a waveform as shown in FIG. 2(b) appears at the output terminal 5. The video signal as shown in FIG. 2(b) is then frequency modulated and thereafter recorded on a video tape (not shown) via a video head (not shown). However, since the frequency ranges of the video tape and the video head are limited, the video signal shown in FIG. 2(b) is clipped at a clipping level indicated by broken line S in FIG. 2(b) before frequency modulated. But the clipped video signal as shown in FIG. 2(c) is distorted. In order to avoid this distorsion, the emphasis factor, or the amount of emphasis, $$\left( = \frac{R_b + R_a}{R_a} \right)$$

is reduced to a half (in this case, $$\frac{R_b + R_a}{R_a} = 2.5)$$

as shown in FIG. 2(d), instead of clipping the video signal. In this case, however, the S/N (signal to noise ratio) of the reproduced video signal is reduced with the reduction of the emphasis effect.

The above-described clipping level is called the white clip level which determines the threshold level of the frequency range in which the signal is not distorted.

Figure 3:
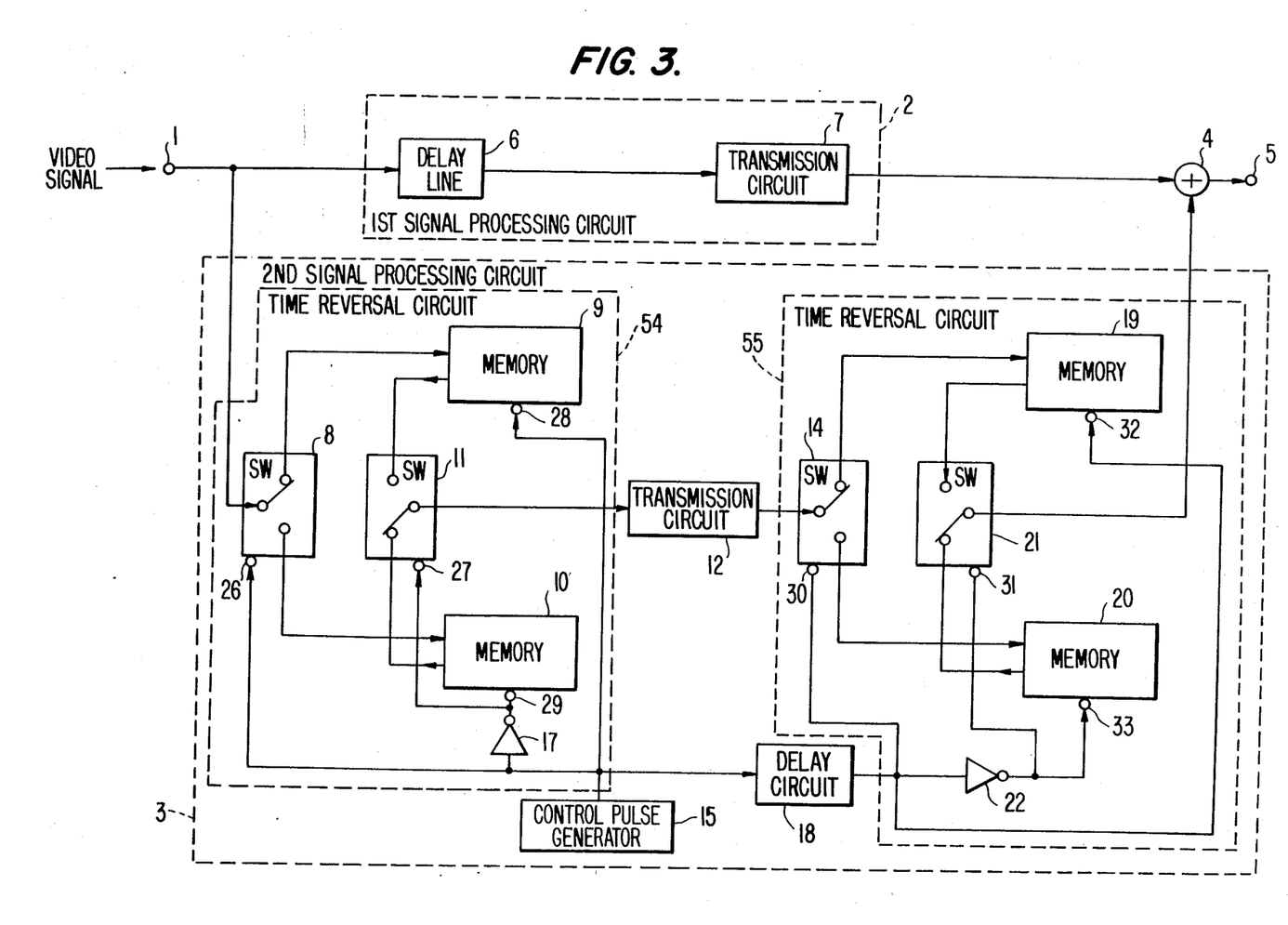
FIG. 3 is a block diagram showing an embodiment of the signal processing apparatus of the invention.

FIG. 3 shows an embodiment of a signal processing apparatus of this invention used as an emphasis circuit. In FIG. 3, a video signal fed to an input terminal 1 is processed by a first signal processing circuit 2 and a second signal processing circuit 3. These processed signals are added by an adder circuit 4. In order to adjust signal level, the adder circuit 4 has also a function to reduce the added signal level to a certain level, for example to a half. The first signal processing circuit 2 is composed of a 4H delay line 6 (H denotes a horizontal synchronizing internal) and a first transmission circuit 7 having a transfer function G. The amplitude-frequency characteristic of the first transmission circuit 7 determines the amplitude-frequency characteristic of the signal processing apparatus.

The first transmission circuit 7 may have any amplitude-frequency characteristic according to its application. In this embodiment, the first transmission circuit 7 has an emphasis characteristic. The emphasis circuit shown in FIG. 1 can be used as the first transmission circuit 7. When the video signal shown in FIG. 4(a) is fed to an input terminal 1, a emphasized video signal as shown in FIG. 4(c) appears at the output terminal of the first signal transmission circuit 2.

Figure 4:
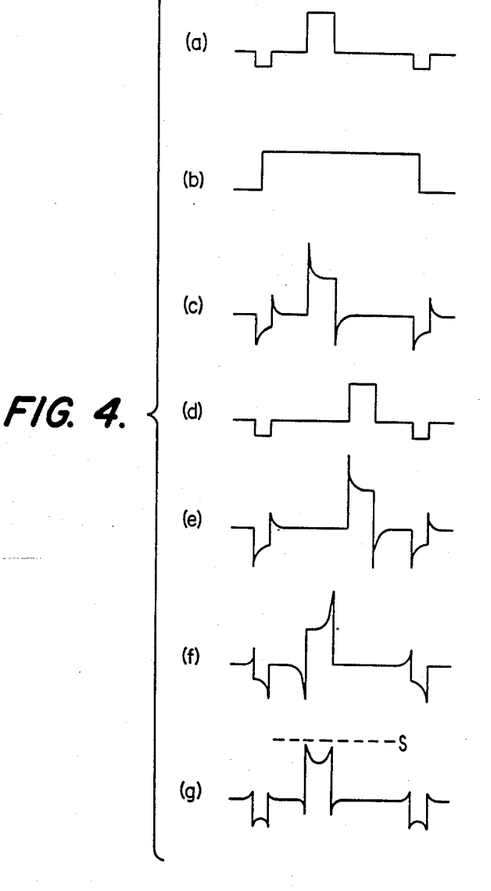
FIG. 4(a)-(g) is waveform diagrams for explaining the signal processing operation of the embodiment in FIG. 3.

On the other hand, a control pulse sequence whose level is alternating with a line (1H) as shown in FIG. 4(b) is produced by a control pulse generator 15. This control pulse sequence can be obtained by, for example, applying a horizontal synchronizing signal separated from the input video signal to a flip-flop circuit (not shown in the figure). The control pulse sequence is, on one hand, applied to a control terminal 26 of a first switch 8, a control terminal 28 of a first memory circuit 9, and through an inverter 17 to a control terminal 27 of a second switch 11 and a control terminal 29 of a second memory circuit 10. The control pulse sequence is, on the other hand, applied through a pulse delay circuit 18 composed for example of two stages of monostable multivibrators to a control terminal 30 of a third switch 14, a control terminal 32 of a third memory circuit 19, and further through an inverter 22 to a control terminal 31 of a fourth switch 21 and a control terminal 33 of a fourth memory circuit 20. The delay time of the pulse delay circuit 18 is the same as that of a second transmission circuit 12 which will be described later.

The input video signal applied to the second signal processing circuit 3 is switched alternatively line by line by the first switch 8 to the first memory circuit 9 and the second memory circuit 10. Each of the first and second memory circuits 9 and 10 is composed, for example, of a LIFO (last-in-first-out) analog memory, which is capable of storing 1H analog signals. When the level of the control signal is high, the first memory circuit 9 is in write-in mode and the second memory circuit 10 is in read-out mode, and when the level of the control signal is low, the first memory circuit 9 is in read-out mode and the second memory circuit 10 is in write-in mode. The second switch 11 operates to alternatively connect the output of the memory circuit 9 or 10 which is in read-out mode to the input of the second transmission circuit 12. Since the first and second memory circuit are LIFO memories, the signal sequence appeared at the output terminal of the second switch 11 in each line (1H) period is a time reversed signal sequence as shown in FIG. 4(d) with respect to the input video signal sequence applied to the input terminal 1. Accordingly, the first and second switches 8, 11, the first and second memory circuits 9, 10, and the inverter 17 constitutes a first time reversal circuit 54 which produces a time reversed signal in each horizontal synchronizing interval.

The time reversed signal produced by the first time reversal circuit 54 is applied to the second transmission circuit 12 having a transfer function G which is the same as that of the first transmission circuit 7. The output signal of the second transmission circuit 12 as shown in FIG. 4(e) is applied to a second time reversal circuit 55 composed of the third switch 14, the third memory circuit 19, the fourth switch 21, the fourth memory circuit 20 and the inverter 22. The operation of the second time reversal circuit 55 is the same as that of the first time reversal circuit 55. Accordingly, the output signal of the second time reversal circuit 55 is as shown in FIG. 4(f), which is a time reversed signal in 1H period with respect to the output signal shown in FIG. 4(e) of the second transmission circuit 12.

The output signals of the first and second signal processing circuits 2 and 3 as shown in FIGS. 4(c) and (f) are added and reduced in level to a half by the adder circuit 4 to become a resulted signal as shown in FIG. 4(g). This signal shown in FIG. 4(g) has a preshoot and an overshoot which are lower in level than the white clip level S but maintain the same emphasis factor $(R_b+R_a)/R_a$ as that of the conventional emphasis circuit shown in FIG. 1.

Each of the first, second, third and fourth memory circuits 9, 10, 19 and 20 may be either an analog memory such as the charge coupled device which is a kind of charge transfer devices or a digital memory associated with an A/D and D/A converters.

Also, the circuit of FIG. 3 as a whole may be constructed by digital circuit elements. In this case, an A/D converter is provided after the input terminal 1; the 4H delay line 6 can be replaced by a digital memory (e.g. flip-flop circuits); the first, second, third and fourth memory circuits 9, 10, 11 and 12 by digital memories; the first and second transmission circuits 7 and 12 by non-recursive type or recursive type digital filters; and an D/A converter is provided before the output terminal 5.

Further, the level inverting period of the control pulse sequence produced by the control pulse generator 15 may not be a line (1H), but may be some lines, a field or a frame of video signal.

In the above description, the signal processing apparatus of this invention is described as an emphasis circuit, but at the same time it is also an apparatus for providing an arbitrary amplitude-frequency characteristic with flat group delay-frequency characteristic as will be described below.

The video signal applied to the input terminal 1 is assumed a sequence x(n) which is a sampled signal. The transfer function G of the first transmission circuit 7 or the second transmission circuit 12 is represented by a z transform G(z). The 4H delay line 6 for compensating the time difference between the first and second signal processing circuits 2 and 3 does not contribute to the transfer function of the apparatus. The output signal of the first signal processing circuit 2 is assumed a sequence v(n). At the output terminal of the second switch 11 appears a signal sequence $a(n)=x(-n)$ as a result of the operation of the time revarsal circuit 54. The output signal sequence of the second transmission circuit 12 is assumed f(n). At the output terminal of the fourth switch 21 appears a signal sequence $b(n)=f(-n)$ as a result of the operation of the time reversal circuit 55. The signal sequence v(n) and f(−n) are added by the adder 4, and the level of the resultant added signal is reduced to a half. This level reduced signal is assumed a sequence y(n). These x(n), x(−n), a(n), f(n), f(−n), b(n), v(n) and y(n) are represented by z transforms X(z), X(z$^{-1}$), A(z), F(z), F(z$^{-1}$), B(z), V(z) and Y(z), respectively. The transfer function of the signal processing apparatus of this invention is assumed I(e$^{j\omega}$) and its transform I(z). The I(e$^{j\omega}$) is expressed as follows:

$$A(z) = X(z^{-1}) \tag{101}$$

$$F(z) = G(z)A(z) = G(z)X(z^{-1}) \tag{102}$$

$$B(z) = F(z^{-1}) = G(z^{-1})X(z) \tag{103}$$

$$V(z) = G(z)X(z) \tag{104}$$

$$Y(z) = \frac{1}{2}\{B(z) + V(z)\} \tag{105}$$

$$= \frac{1}{2}X(z)\{G(z) + G(z^{-1})\}$$

$$I(z) = Y(z)/X(z) \tag{106}$$

$$= \frac{G(z) + G(z^{-1})}{2}$$

$$I(e^{j\omega}) = |G(e^{j\omega})|\cos\phi(\omega) \tag{107}$$

where $$G(e^{j\omega}) = |G(e^{j\omega})|e^{j\phi(\omega)} \tag{108}$$

The equation (107) shows that the signal processing apparatus of this invention has zero phase-frequency characteristic, or flat group delay-frequency characteristic. Also, arbitrary amplitude-frequency characteristic can be obtained by arbitrarily selecting the values of $|G(e^{j\omega})|$ and $\cos\phi(\omega)$ in the equation (107).

Figure 5:
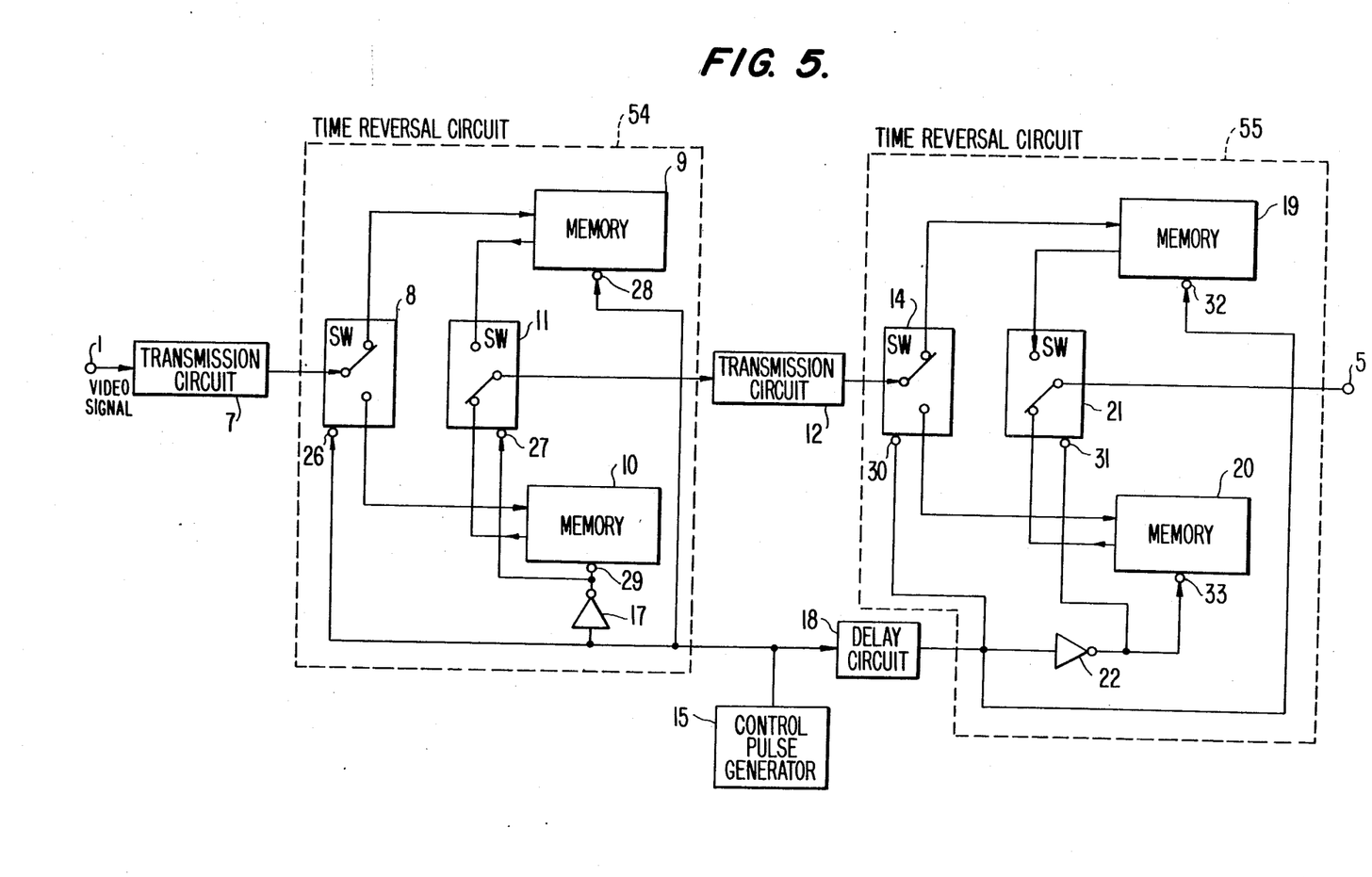
FIG. 5 is a block diagram showing another embodiment of the signal processing apparatus of the invention.
Figure 6:
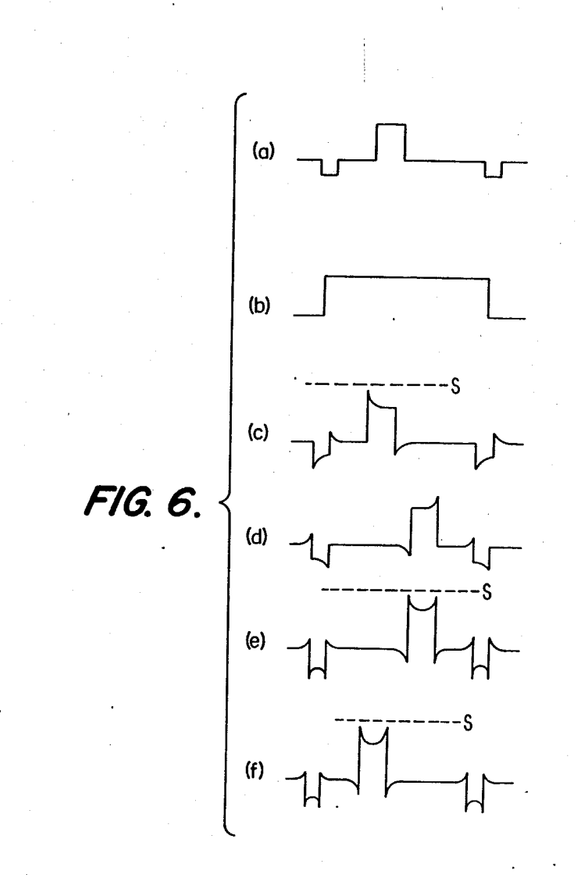
FIGS. 6(a)-(f) is waveform diagrams for explaining the signal processing operation of the embodiment in FIG. 5.

FIG. 5 shows another embodiment of the signal processing apparatus of this invention as an emphasis circuit. In FIG. 5, an input video signal fed to an input terminal 1 is applied to a first transmission circuit 7 having a transfer function G. For example, the first transmission circuit 7 is the emphasis circuit as shown in FIG. 1. The emphasis factor $(R_b+R_a)/R_a$ is selected, for example, $\sqrt{5}$. When the input video signal is as shown in FIG. 6(a), a signal as shown in FIG. 6(c) is obtained at the output terminal of the first transmission circuit 7.

On the other hand, a control pulse sequence alternating in level with line (H) is produced by a control pulse generator 15. This control pulse sequence is, on one hand, applied to a control terminal 26 of a first switch 8, a control terminal 28 of a first memory circuit 9, and through an inverter 17 to a control terminal 27 of a second switch 11 and a control terminal 29 of a second memory circuit 10. The control pulse sequence is, on the other hand, applied to a pulse delay circuit 18 having the same delay time as that of a second transmission circuit 12 which will be described later. An output pulse signal of the pulse delay circuit 18 is applied to a control terminal 30 of a third switch 14, a control terminal 32 of a third memory circuit 19, and through an inverter 22 to a control terminal 31 of a fourth switch 21 and a control terminal 33 of a fourth memory circuit 20. The first switch 8, the second switch 11, the first memory circuit 9, the second memory circuit 10 and the inverter 17 constitute a time reversal circuit 54 which operates in the same way as the time reversal circuit 54 in FIG. 3. Therefore, an output signal of the time reversal circuit 54 is a time reversed signal as shown in FIG. 6(d). This time reversed signal is applied to the second transmission circuit 12 having a transfer function G which is the same as that of the first transmission circuit 7. FIG. 6(e) shows an output signal of the second transmission circuit 12. This output signal is applied to another time reversal circuit 55 composed of the third switch 14, the fourth switch 21, the third memory circuit 19, the fourth memory circuit 20 and the inverter 22. The time reversal circuit 55 operates in the same way as the time reversal circuit 55 in FIG. 3. An output signal appeared at the output terminal 5 is as shown in FIG. 6(f), which has a preshoot and an overshoot. Therefore, the peak level of the signal is lower than the white clip level S, but the emphasis factor is maintained the same as that of the conventional emphasis circuit shown in FIG. 1.

The preshoot and overshoot form an exactly symmetrical waveform. This means that the signal processing apparatus of this invention has the flat group delay-frequency characteristic and the same amplitude-frequency characteristic as that of the convensional emphasis circuit as shown in FIG. 1. Accordingly, although the transmission circuits 7 and 12 are the emphasis circuits as shown in FIG. 1 in the above embodiment, they may be any circuits having arbitrary transfer function. Namely, a signal processing apparatus of this invention has the flat group delay-frequency characteristic and the arbitrary amplitude-frequency characteristic.

The video signal applied to the input terminal 1 is assumed a signal sequence x(n) which is a sampled signal. The transfer function $G(e^{j\omega})$ of the transmission circuit 7 or 12 is represented by a z transform $G(z)$. The output signal sequence of the first transmission circuit 7 is assumed v(n). The output signal sequence of the time reversal circuit 54 is assumed a(n) which is equal to v(−n). The output signal sequence of the second transmission circuit 12 is assumed f(n). The output signal sequence of the time reversal circuit 55 is assumed b(n) which is equal to f(−n). These x(n), v(n), a(n), f(n) and b(n) are represented by Z transforms $X(z)$, $V(z)$, $A(z)$, $F(z)$ and $B(z)$, respectively. The transfer function of the signal processing apparatus of this invention is assumed $I(e^{j\omega})$ and its z transform $I(z)$. The $I(e^{j\omega})$ can be obtained by the following equations:

$$V(z) = G(z)X(z) \tag{201}$$

$$A(z) = V(z^{-1}) \tag{202}$$

$$= G(z^{-1})X(z^{-1})$$

-continued $$F(z) = G(z)A(z) \tag{203}$$

$$= G(z)G(z^{-1})X(z^{-1}) \tag{204}$$

$$B(z) = F(z^{-1}) \tag{205}$$

$$= G(z^{-1})G(z)X(z) \tag{206}$$

$$I(z) = \frac{B(z)}{X(z)} \tag{207}$$

$$= G(z^{-1})G(z)$$

$$I(e^{j\omega}) = |G(e^{j\omega})|^2 \tag{208}$$

The equation (208) shows that the signal processing apparatus of this invention has zero phase-frequency characteristic, or flat group delay-frequency characteristic. Also, by arbitrarily selecting the value of $|G(e^{j\omega})|^2$ arbitrary amplitude-frequency characteristic can be obtained.

Figure 7:
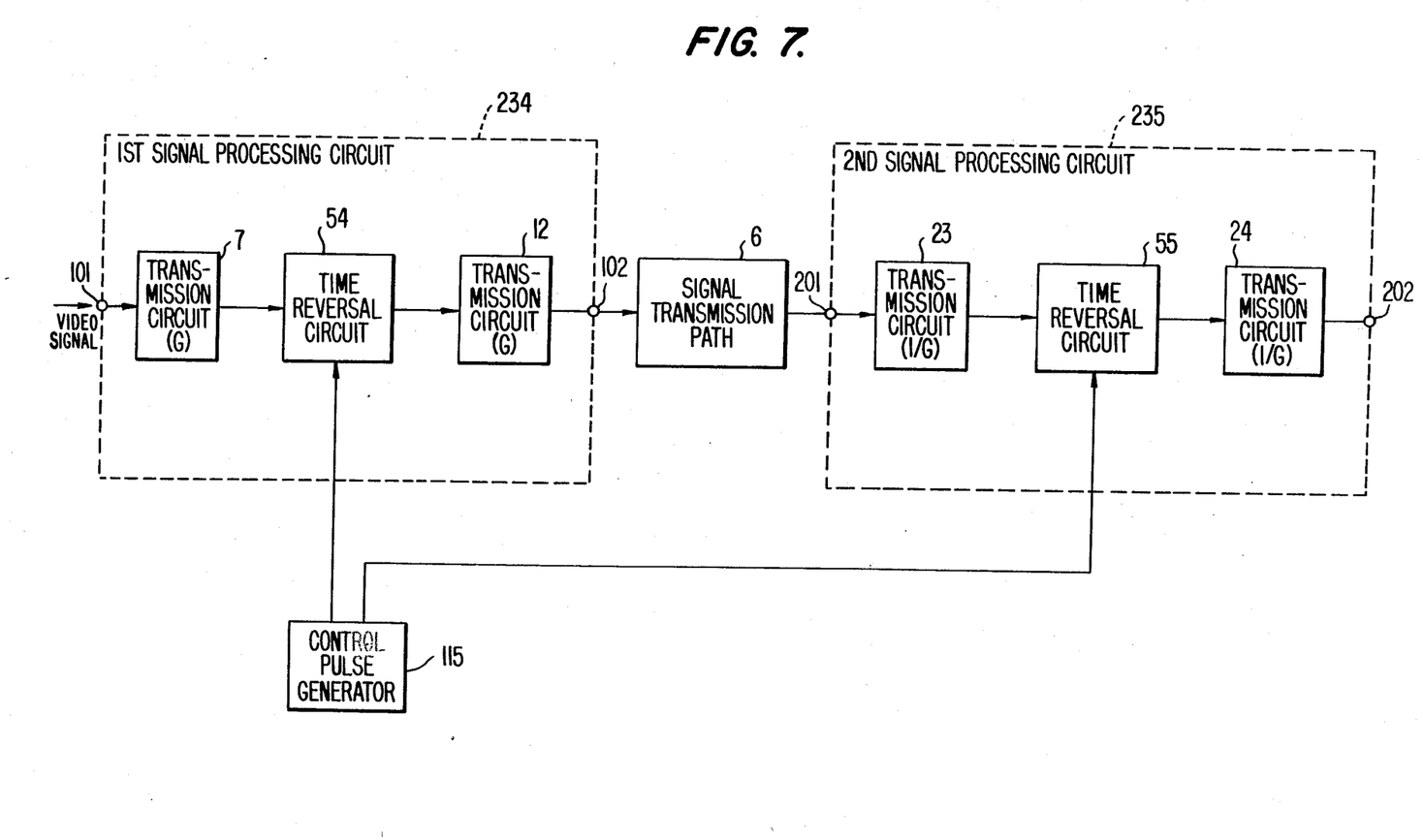
FIG. 7 is a block diagram showing still another embodiment of the signal processing apparatus of the invention.

FIG. 7 shows a further embodiment of this invention comprising a first signal processing circuit 234 and a second signal processing circuit 235. An video signal fed to an input terminal 101 is applied to a first transmission circuit 7 having a transfer function G. The amplitude-frequency characteristic of the first transmission circuit 7 determines the amplitude-frequency characteristic of the signal processing apparatus. The first transmission circuit 7 may have an arbitrary amplitude-frequency characteristic. For example, the first transmission circuit 7 is the emphasis circuit as shown in FIG. 1. The emphasis factor $(R_b+R_a)/R_a$ is selected, for example, $\sqrt{5}$. When a video signal shown in FIG. 8(a) is fed to the first transmission circuit 7, a processed signal as shown in FIG. 8(c) is obtained at the output terminal of the first transmission circuit 7.

Figure 8:
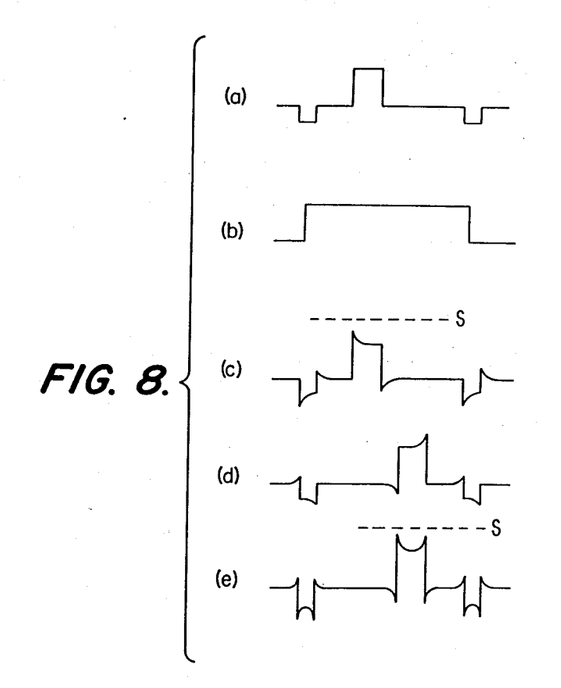
FIGS. 8(a)-(e) is waveform diagrams for explaining the signal processing operation of the embodiment in FIG. 7.

On the other hand, a control pulse sequence alternating in level with line as shown in FIG. 8(b) produced by a control pulse generator 115 is applied to a time reversal circuit 54 which is the same as the time reversal circuit 54 in FIG. 3 for controlling the signal reversing period of the same. The output signal of the time reversal circuit 54 is a time reversed signal as shown in FIG. 8(d). This time reversed signal is applied to a second transmission circuit 12 having the same transfer function G as that of the first transmission circuit 7. The output signal of the second transmission circuit 12 appearing at the output terminal 102 is as shown in FIG. 8(e). In a video tape recorder, for example, this output signal having a preshoot and an overshoot is then frequency modulated and recorded on a video tape by a video head. A signal transmission path 60 represents a video tape recorder or a satelite broadcasting system.

In the reproduction mode of the video tape recorder, the video head scans the recorded video tape and reproduces the recorded signal. The reproduced signal is applied to a frequency demodulator (not shown) which demodulates (converts) the reproduced signal to the video signal as shown in FIG. 8(e). The demodulated video signal is applied to an input terminal 201 of the second signal processing circuit 235. The input video signal is applied to a third transmission circuit 23 having a transfer function 1/G which is the inverse number of the transfer function of the first or second transmission circuit 7 or 12. Accordingly, the output signal of the third transmission circuit 23 is a de-emphasized signal as shown in FIG. 8(d) and applied to a time reversal circuit 55 which is the same as the time reversal circuit 55 shown in FIG. 3. And the time reversal circuit 55 is controled by another control pulse sequence alternating in level with line produced by the control pulse generator 115. The output signal of the time reversal circuit 55, which is a time reversed signal as shown in FIG. 8(c), is applied to a fourth transmission circuit 24 having the same transfer function 1/G as that of the third transmission circuit 23. Accordingly, a signal which is the same as the signal originally supplied at the input terminal 101 as shown in FIG. 8(a) is obtained at an output terminal 202.

The signal shown in FIG. 8(e) has a preshoot and an overshoot, so that the peak level of the wave is lower than the white clip level S, but maintaining the same emphasis factor as that of the conventional emphasis circuit shown in FIG. 1.

The preshoot and overshoot form an exactly symmetrical wave form. This means that the signal processing apparatus of this invention has the flat group delay-frequency characteristic and the same amplitude-frequency characteristic as that of the conventional emphasis circuit as shown in FIG. 1. Accordingly, although the transmission circuit 7 and 12 are the emphasis circuits as shown in FIG. 1 in the above embodiment, they may be any circuits having arbitrary transfer functions. Namely, a signal processing apparatus of this invention has flat group delay-frequency characteristic and arbitrary amplitude-frequency characteristic as will be described in detail below.

The video signal applied to the input terminal 101 is assumed a signal sequence x(n) which is a sampled signal. The transfer function $G(e^{j\omega})$ of the transmission circuit 7 or 12 is represented by a z transform G(z). The output signal sequence of the first transmission circuit 7 is assumed v(n). The output signal sequence of the time reversal circuit 54 is assumed a(n) which is equal to v(−n). The output signal sequence of the second transmission circuit 12 is assumed f(n). These x(n), v(n), a(n) and f(n) are represented by z transforms X(z), V(z), A(z) and F(z). The following equations (301)–(303) are conducted by the first signal processing circuit 234:

$$V(z) = G(z)X(z) \quad (301)$$

$$A(z) = V(z^{-1}) = G(z^{-1})X(z^{-1}) \quad (302)$$
$$= G(z^{-1})X(z^{-1})$$

$$F(z) = G(z)A(z) \quad (303)$$
$$= G(z)G(z^{-1})X(z^{-1})$$

The inverse z transform of $G(z)G(z^{-1})$ is $|G(e^{j\omega})|^2$. Namely, the equation (303) shows that the first signal processing circuit 234 has a transfer function $|G(e^{j\omega})|^2$ and a time reversal function. This means that the transfer function of the first signal processing circuit 234 has the zero phase-frequency characteristic, or the flat group delay-frequency characteristic, and such an amplitude-frequency characteristic as the squared absolute value of the transfer function of the first or second transmission circuit 7 or 12.

Similarly, the second signal processing circuit 235 has a transfer function $$\frac{1}{|G(e^{j\omega})|^2}$$

and a time reversal function. This means that the transfer function of the second signal processing circuit 235 has the zero phase-frequency characteristic, or the flat group delay-frequency characteristic, and such an amplitude-frequency characteristic as the squared absolute value of the transfer function of the third or fourth transmission circuit 23 or 24.

In the foregoing description, the theoretical background is taught in detail in "THEORY AND APPLICATION OF DIGITAL SIGNAL PROCESSING" by Lawrence R. Rabiner-Bernard Gold, pp 205–209.

Further, the scope of the present invention is not limited to the embodiments described above, but various changes and modifications are made within the scope of the present invention.

What is claimed is:

1. A signal processing apparatus comprising:
   a video signal input terminal for feeding an input video signal;
   a delay line for delaying said input video signal;
   a first transmission circuit having a transfer function G for processing the video signal delayed by said delay line;
   a first time reversal circuit for reversing the time sequence of said input video signal in a predetermined period;
   a second transmission circuit having the transfer function G for processing the time reversed signal from said first time reversal circuit;
   a second time reversal circuit for reversing the time sequence of the signal processed by said second transmission circuit in said predetermined period;
   an adder circuit for adding the signal processed by said first transmission circuit and the time reversed signal from said second time reversed circuit; and
   a control pulse generator for producing a control pulse sequence inverting its level with said predetermined period to control said first and second time reversal circuits.

2. The apparatus according to claim 1, wherein said predetermined time period is 1H (H denotes one horizontal synchronizing interval).

3. The apparatus according to claim 2, wherein the delay time of said delay line is 4H.

4. The apparatus according to claim 1, wherein each of said first and second transmission circuits is an emphasis circuit.

5. The apparatus according to claim 1, wherein said first time reversal circuit comprises: a first LIFO (last-in-first-out) memory capable of storing said input video signal by said predetermined period; a second LIFO memory capable of storing said input video signal by said predetermined period; a first changeover switch for alternatively connecting said video signal input terminal to an input terminal of one of said first and second LIFO memories which is in write-in mode; and a second changeover switch for connecting an input terminal of said second transmission circuit to an output terminal of one of said first and second LIFO memories which is in read-out mode, each of said first and second LIFO memories repeating alternatingly write-in mode and read-out mode with said predetermined period and when one of said first and second memories is in write-in mode the other being in read-out mode, and
   wherein said second time reversal circuit comprises: a third LIFO memory capable of storing the signal processed by said second transmission circuit by said predetermined period; a fourth LIFO memory capable of storing the signal processed by said second transmission circuit by said predetermined period; a third changeover switch for alternatively connecting an output terminal of said second transmission circuit to an input terminal of one of said third and fourth LIFO memories which is in write-in mode; and a fourth changeover switch for connecting an input terminal of said adder circuit to an output terminal of one of said third and fourth LIFO memories which is in read-out mode, each of said third and fourth LIFO memories repeating alternatingly write-in mode and read-out mode with said predetermined period and when one of said third and fourth memories is in write-in mode the other being in read-out mode.

6. The apparatus according to claim 5, wherein said predetermined period is 1H (H denotes one horizontal synchronizing interval).

7. The apparatus according to claim 5, wherein said control pulse sequence is applied: to a control terminal of each of said first switch and said first LIFO memory and through an inverter to a control terminal of each of said second switch and said second LIFO memory; and through a pulse delay circuit having a delay time equal to that of said second transmission circuit to a control terminal of each of said third switch and said third LIFO memory and through an inverter to a control terminal of said fourth switch and said fourth LIFO memory.

8. A signal processing apparatus comprising:
a video signal input terminal for feeding an input video signal;
a first transmission circuit having a transfer function G for processing said input video signal;
a first time reversal circuit for reversing the time sequence of the signal processed by said first transmission signal in a predetermined period;
a second transmission circuit having the transfer function G for processing the time reversed signal from said first time reversal circuit;
a second time reversal circuit for reversing the time sequence of the signal processed by said second transmission circuit; and
a control pulse generator for producing a control pulse sequence inverting its level with said predetermined period for controlling said first and second time reversal circuits.

9. The apparatus according to claim 8, wherein said predetermined time period is 1H (H denotes one horizontal synchronizing interval).

10. The apparatus according to claim 8, wherein each of said first and second transmission circuits is an emphasis circuit.

11. The apparatus according to claim 8, wherein said first time reversal circuit comprises: a first LIFO (last-in-first-out) memory capable of storing said input video signal by said predetermined period; a second LIFO memory capable of storing said input video signal by said predetermined period; a first changeover switch for alternatively connecting said video signal input terminal to an input terminal of one of said first and second LIFO memories which is in write-in mode; and a second changeover switch for connecting an input terminal of said second transmission circuit to an output terminal of one of said first and second LIFO memories which is in read-out mode, each of said first and second LIFO memories repeating alternatingly write-in mode and read-out mode with said predetermined period and when one of said first and second memories is in write-in mode the other being in read-out mode, and wherein said second time reversal circuit comprises: a third LIFO memory capable of storing the signal processed by said second transmission circuit by said predetermined period; a fourth LIFO memory capable of storing the signal processed by said second transmission circuit by said predetermined period; a third changeover switch for alternatively connecting an output terminal of said second transmission circuit to an input terminal of one of said third and fourth LIFO memories which is in write-in mode; and a fourth changeover switch for connecting an output terminal of said apparatus to an output terminal of one of said third and fourth LIFO memories which is in read-out mode, each of said third and fourth LIFO memories repeating alternatingly write-in mode and read-out mode with said predetermined period and when one of said third and fourth memories is in write-in mode the other being in read-out mode.

12. The apparatus according to claim 11, wherein said predetermined period is 1H (H denotes one horizontal synchronizing interval).

13. The apparatus according to claim 11, wherein said control pulse sequence is applied: to a control terminal of each of said first switch and said first LIFO memory and through an inverter to a control terminal of each of said second switch and said second LIFO memory; and through a pulse delay circuit having a delay time equal to that of said second transmission circuit to a control terminal of each of said third switch and said third LIFO memory and through an inverter to a control terminal of said fourth switch and said fourth LIFO memory.

14. A signal processing apparatus comprising:
a video signal input terminal for feeding an input video signal;
a first transmission circuit having a transfer function G for processing said input video signal;
a first time reversal circuit for reversing the time sequence of the signal processed by said first transmission circuit in a predetermined period;
a second transmission circuit having a transfer function G for processing the time reversed signal from said first time reversal circuit;
a signal transmission path for transmitting the signal processed by said second transmission circuit;
a third transmission circuit having a transfer function 1/G for processing the signal transmitted by said signal transmission path;
a second time reversal circuit for reversing the time sequence of the signal processed by said third transmission circuit in said predetermined period;
a fourth transmission circuit having the transfer function 1/G for processing the time reversed signal from said second time reversal circuit; and
a control pulse generator for producing a first and a second control pulse sequences each inverting its level with said predetermined period.

15. The apparatus according to claim 14, wherein said predetermined time period is 1H (H denotes one horizontal synchronizing interval).

16. The apparatus according to claim 14, wherein each of said first and second transmission circuits is an emphasis circuit and each of said third and fourth transmission circuits is a de-emphasis circuit.

17. The apparatus according to claim 14, wherein said first time reversal circuit comprises: a first LIFO (last-in-first-out) memory capable of storing said input video signal by said predetermined period; a second LIFO memory capable of storing said input video signal by said predetermined period; a first changeover switch for alternatively connecting said video signal input terminal to an input terminal of one of said first and second LIFO memories which is in write-in mode; and a second changeover switch for connecting an input terminal of said second transmission circuit to an output terminal of one of said first and second LIFO memories which is in read-out mode, each of said first and second LIFO memories repeating alternatingly write-in mode and read-out mode with said predetermined period and when one of said first and second memories is in write-in mode the other being in readout mode, and wherein said second time reversal circuit comprises: a third LIFO memory capable of stroing the signal processed by said third transmission circuit by said predetermined period; a fourth LIFO memory capable of storing the signal processed by said third transmission circuit by said predetermined period; a third changeover switch for alternatively connecting an output terminal of said third transmission circuit to an input terminal of one of said third and fourth LIFO memories which is in write-in mode; and a fourth changeover switch for connecting an input terminal of said fourth transmission circuit to an output terminal of one of said third and fourth LIFO memories which is in read-out mode, each of said third and fourth LIFO memories repeating alternatingly write-in mode and read-out mode with said predetermined period and when one of said third and fourth memories is in write-in mode the other being in read-out mode.

18. The apparatus according to claim 17, wherein said predetermined period is 1H (H denotes one horizontal synchronizing interval).

19. The apparatus according to claim 17, wherein said first control pulse sequence is applied to a control terminal of each of said first switch and said first LIFO memory and through an inverter to a control terminal of each of said second switch and said second LIFO memory; and said second control pulse sequence is applied to a control terminal of each of said third switch and said third LIFO memory and through an inverter to a control terminal of said fourth switch and said fourth LIFO memory.

* * * * *